UNITED STATES PATENT OFFICE.

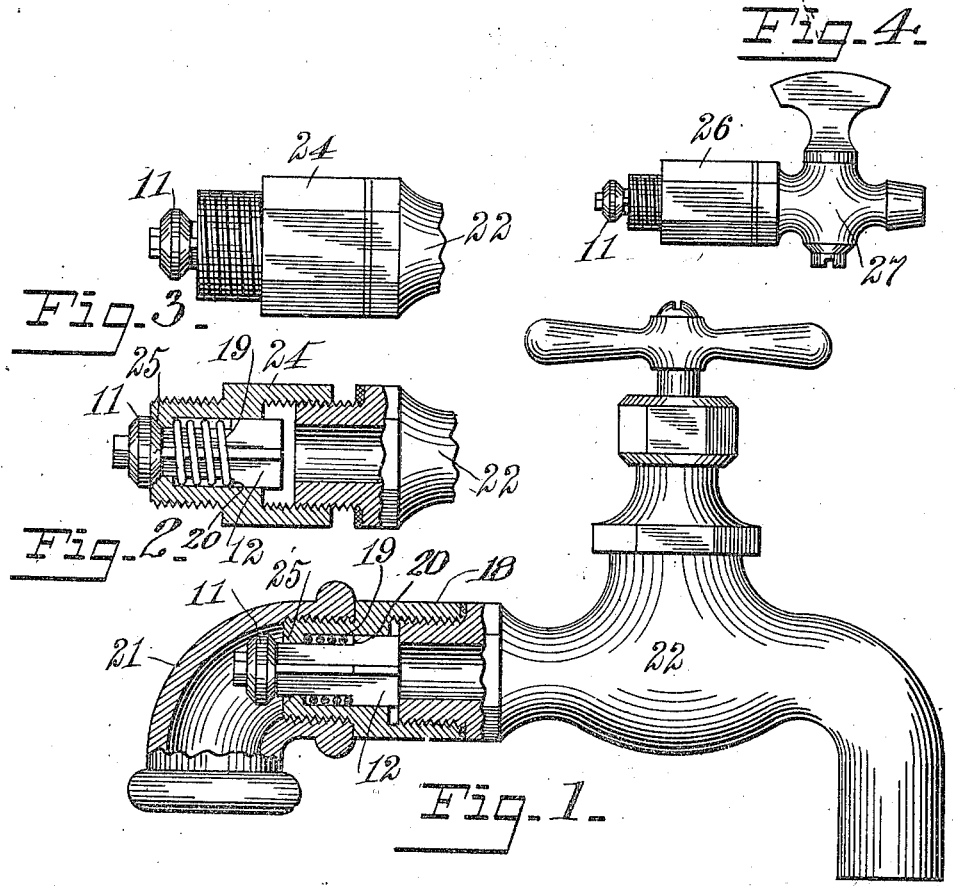

THOMAS A. SAMMONS, OF DAYTON, OHIO.

AUTOMATIC CUT-OFF VALVE AND FAUCET MECHANISM.

1,268,160.   Specification of Letters Patent.   Patented June 4, 1918.

Application filed February 21, 1917. Serial No. 150,032.

*To all whom it may concern:*

Be it known that I, THOMAS A. SAMMONS, citizen of the United States, residing at Dayton, in the county of Montgomery and State of Ohio, have invented certain new and useful Improvements in Automatic Cut-Off Valves and Faucet Mechanisms; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to certain new and useful improvements in valve and faucet mechanisms. The primary object of the invention is to provide quick and convenient means for shutting off the flow of water when it becomes necessary to remove a faucet for any reason.

Preceding a more detailed description of my improvements, reference is made in general terms to the accompanying drawings, in which Figure 1 is an elevation of a bib or faucet part of which appears in section and in which my improved cut-off valve is shown in the portion of the faucet between the entrance of the inlet pipe and the valve of the faucet. Fig. 2 is a sectional view showing a modification of the union which connects the automatic shut-off valve with the bib. Fig. 3 is an elevation of the modification shown in Fig. 2, and Fig. 4 is an elevation of a steam cock with my automatic shut-off valve applied thereto in a manner similar to Figs. 2 and 3.

In a detailed description of my improvements, the same reference characters will denote corresponding parts in the several views of the drawings.

Referring to Fig. 1, this illustrates a common form of cock 22 with a union or coupling member 18 which forms a connection between the inlet end of the cock and the intake fitting 21 which connects with the supply pipe. It will be observed that the fitting 21 is in the form of an elbow which screws onto the coupling member 18. The shut-off valve 11 lies horizontally within the connection 18. The automatic shut-off valve 11 is in the form of a puppet valve and the normal position of said valve is open as shown in Fig. 1 it being held in such position by the end of the faucet when the latter is screwed onto the coupling member 18. The said shut-off valve is provided with guide extensions in the form of radial veins 12. The veins 12 are reduced in diameter or cut away to provide a suitable space for the coil spring 19. It will be observed that the spring 19 is mounted on the valve directly and is inclosed between shoulders 20 of the veins 12 and the inwardly extended flange at the end of the union 18. It will be observed from Fig. 1 that the shut-off valve is held off of the seat 25 in the end of the union 18 and the spring 19 is under compression. When the bib is detached, the shut-off valve will be immediately thrown to its seat by the expanding effect of the spring. Fig. 2 illustrates a modification of Fig. 1 in which the connection between the inlet end of the cock and the supply pipe is effected through a union or coupling 24 and to one end of which the inlet end of the cock is tapped and on the other end of which the supply pipe is connected by exterior screw threads. The cut-off valve 11 in this case seats against the seat 25 on the end of the coupling 24, and the spring 19 is mounted upon the valve veins 12 in a manner similar to Fig. 1. In Fig. 2 the shut-off valve 11 is shown on its seat, the cock 22 having been partially unscrewed from the coupling 24. Fig. 4 illustrates a common form of pet-cock 27 to which the shut-off valve is applied by a union 26, which is similar to the union 24 illustrated in Fig. 2.

Having described my invention in detail, the operation is as follows: With the shut-off valve attached to a supply pipe, as shown in Fig. 1 for example, the volume of water to the faucet is regulated by the adjustment of the faucet member in its engagement with the annular shoulder of the coupling 18 and the wing end of the shut-off valve itself. The water is shut off altogether when the disengagement of said faucet member with said shut-off valve takes place.

Having described my invention, I claim:

A faucet having a valve therein controlling the outlet therefrom, a coupling member receiving the inlet end of said faucet and having an inwardly extending flange forming a valve seat, a puppet valve carried by said coupling member having a series of elongated guide extensions which are reduced in diameter for a portion of their length, a spring mounted on the reduced portions of said guide extensions between the shoulder thereon and said flange, said guide extensions being adapted to be engaged by the coupled end of the faucet and to be maintained in a position to hold the valve open, and said spring being adapted to exert a force to close said valve when disengaged by the coupled end of the faucet.

In testimony whereof I affix my signature, in presence of a witness.

THOMAS A. SAMMONS.

Witness:
MATTHEW SIEBLER.